(12) United States Patent
Gould et al.

(10) Patent No.: US 10,346,943 B2
(45) Date of Patent: Jul. 9, 2019

(54) PREFETCHING FOR A GRAPHICS SHADER

(71) Applicant: Microsoft Technology Licensing, LLC, Redmond, WA (US)

(72) Inventors: Jason Gould, Woodinville, WA (US); Ivan Nevraev, Redmond, WA (US); Martin J. I. Fuller, Warwickshire (GB); James A. Goossen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 15/397,500

(22) Filed: Jan. 3, 2017

(65) Prior Publication Data

US 2018/0189924 A1    Jul. 5, 2018

(51) Int. Cl.
| | |
|---|---|
| *G06F 13/00* | (2006.01) |
| *G06T 1/20* | (2006.01) |
| *G06T 1/60* | (2006.01) |
| *G06F 12/0862* | (2016.01) |
| *G06F 9/38* | (2018.01) |
| *G06T 15/00* | (2011.01) |
| *G06F 12/02* | (2006.01) |

(52) U.S. Cl.
CPC .............. *G06T 1/20* (2013.01); *G06F 9/3802* (2013.01); *G06F 12/0862* (2013.01); *G06T 1/60* (2013.01); *G06T 15/005* (2013.01); *G06F 12/0207* (2013.01); *G06F 2212/1024* (2013.01); *G06F 2212/452* (2013.01); *G06F 2212/6028* (2013.01)

(58) Field of Classification Search
None
See application file for complete search history.

(56) References Cited

U.S. PATENT DOCUMENTS

| | | |
|---|---|---|
| 7,245,302 B1 | 7/2007 | Donham et al. |
| 7,568,189 B2 | 7/2009 | Suba et al. |
| 7,948,498 B1 | 5/2011 | Minkin |
| 8,219,722 B2 | 7/2012 | Suba et al. |

(Continued)

OTHER PUBLICATIONS

Woo, et al., "COMPASS: A Programmable Data Prefetcher Using Idle GPU Shaders", In Proceedings of the fifteenth edition of ASPLOS on Architectural support for programming languages and operating systems, Mar. 13, 2010, pp. 297-309.
Andrews, et al., "XBOX 360 System Architecture", In Journal of IEEE Micro, vol. 26, Issue 2, Mar. 2006, pp. 25-37.
Ganusov, et al., "Efficient Emulation of Hardware Prefetchers via Event-driven Helper Threading", In Proceedings of the 15th international conference on Parallel architectures and compilation techniques, Sep. 16, 2006, pp. 144-153.

(Continued)

*Primary Examiner* — Weiming He
(74) *Attorney, Agent, or Firm* — Arent Fox LLP

(57) ABSTRACT

Methods and devices for graphics shading in a computing device. The methods and devices may include receiving a respective cache line of a plurality of cache lines of a shader stored in a memory, wherein the respective cache line and one or more other ones of the plurality of cache lines include at least one jump instruction. Further, the methods and devices may include executing the respective cache line of the shader and skipping to a next portion of the plurality of cache lines based on the at least one jump instruction. Moreover, the methods and devices may include executing one or more prefetchers contemporaneously with the shader in response to the at least one jump instruction, each prefetcher requesting a subsequent one of the plurality of cache lines from the memory, wherein each prefetcher corresponds to a respective jump instruction.

21 Claims, 10 Drawing Sheets

(56) References Cited

U.S. PATENT DOCUMENTS

| | | | |
|---|---|---|---|
| 9,412,197 B2 | 8/2016 | Goel et al. | |
| 2006/0242365 A1* | 10/2006 | Ali | G06F 9/3804 |
| | | | 711/137 |
| 2007/0186050 A1 | 8/2007 | Luick | |
| 2009/0106541 A1* | 4/2009 | Mizuno | G06F 9/3802 |
| | | | 712/239 |
| 2010/0214301 A1 | 8/2010 | Li et al. | |
| 2011/0050716 A1* | 3/2011 | Mantor | G06T 15/005 |
| | | | 345/581 |
| 2012/0268470 A1* | 10/2012 | Duca | G06T 11/206 |
| | | | 345/522 |
| 2013/0145102 A1 | 6/2013 | Wang et al. | |
| 2014/0351520 A1* | 11/2014 | Moharil | G06F 12/0871 |
| | | | 711/122 |
| 2015/0221063 A1 | 8/2015 | Kim et al. | |
| 2015/0378920 A1 | 12/2015 | Gierach et al. | |
| 2017/0293346 A1* | 10/2017 | Barry | G06F 1/3243 |
| 2018/0005345 A1* | 1/2018 | Apodaca | G06T 15/80 |

OTHER PUBLICATIONS

Luk, et al., "Compiler-Based Prefetching for Recursive Data Structures", In ACM SIGOPS Operating Systems Review, vol. 30, Issue 5, Oct. 1, 1996, pp. 222-233.

"International Search Report & Written Opinion Issued in PCT Application No. PCT/US2017/068450", dated Mar. 19, 2018, 12 Pages.

\* cited by examiner

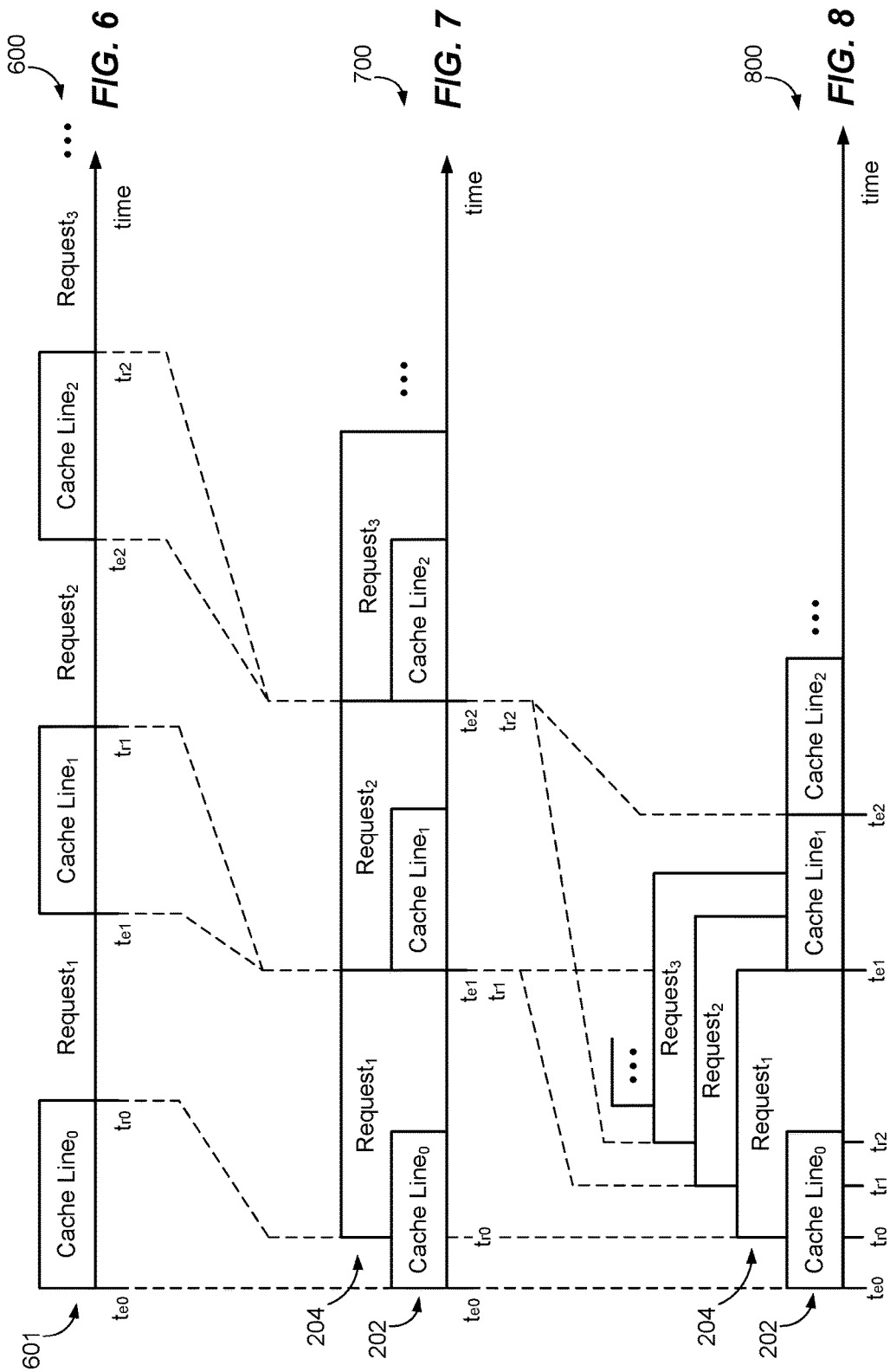

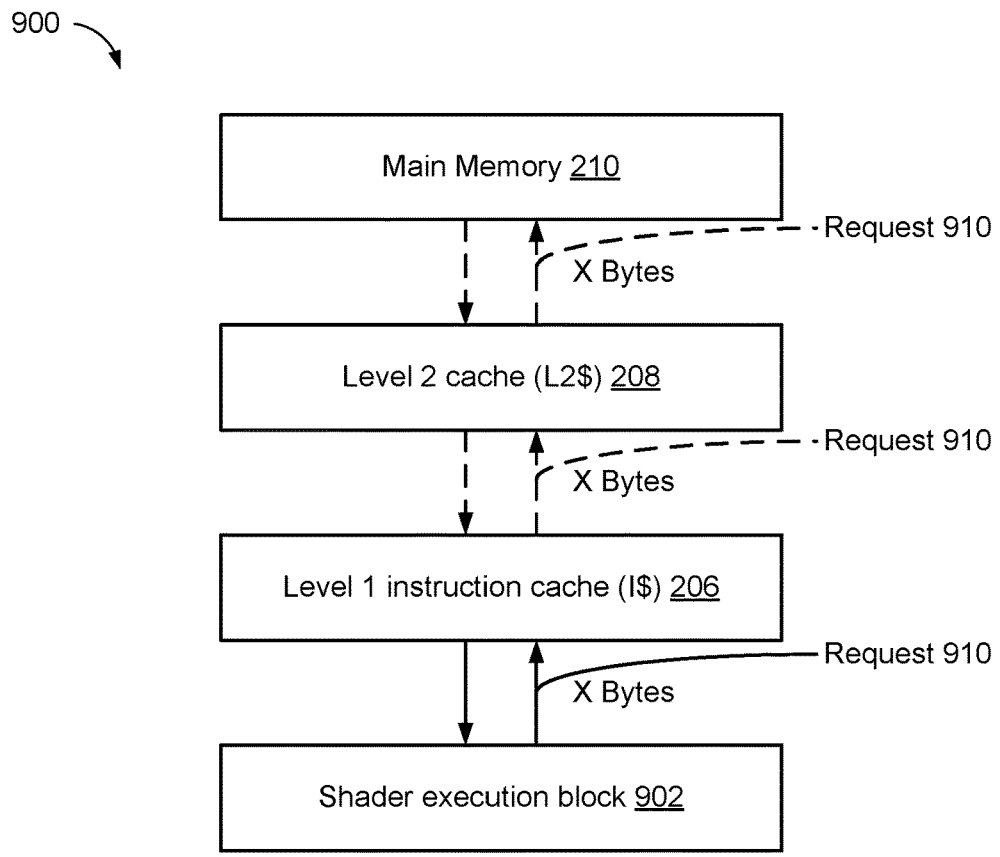
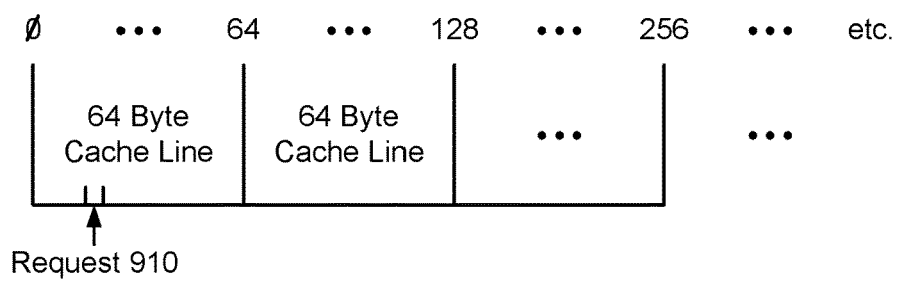
FIG. 9

PREFETCHING FOR A GRAPHICS SHADER

BACKGROUND

The present disclosure relates to a computer device, and more particularly, to performing prefetching for a graphics shader on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DIRECTX collection of application programming interfaces by MICROSOFT CORPORATION, including the DIRECT3D API, is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to fragments being rendered. In particular, for example, a vertex shader processes traits (position, texture coordinates, color, etc.) of a vertex, and a pixel shader processes traits (texture values, color, z-depth and alpha value) of a pixel. Thus, the computer device operates the graphics pipeline to convert information about 3D objects into a bit map that can be displayed, and this process requires considerable memory and processing power.

There are continuing increases in pixel density and display resolution, and a continuing desire for improving latency and reducing bottlenecks in the operation of the shader. Therefore, there is a need in the art for more efficient graphics processing in a computer device.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its purpose is to present some concepts of one or more implementations in a simplified form as a prelude to the more detailed description that is presented later.

In one example, a method of graphics shading in a computing device is provided. In particular, the method may include receiving a respective cache line of a plurality of cache lines of a shader stored in a memory, wherein the respective cache line and one or more other ones of the plurality of cache lines include at least one jump instruction. The method may further include executing the respective cache line of the shader and skipping to a next portion of the plurality of cache lines based on the at least one jump instruction. Additionally, the method may include executing one or more prefetchers contemporaneously with the shader in response to the at least one jump instruction, each prefetcher requesting a subsequent one of the plurality of cache lines from the memory, wherein each prefetcher corresponds to a respective jump instruction.

In another example, a computer device includes a memory and a graphics processing unit (GPU) in communication with the memory. The GPU is configured to receive a respective cache line of a plurality of cache lines of a shader stored in a memory, wherein the respective cache line and one or more other ones of the plurality of cache lines include at least one jump instruction. The GPU is further configured to execute the respective cache line of the shader and skipping to a next portion of the plurality of cache lines based on the at least one jump instruction. Additionally, the GPU is configured to execute one or more prefetchers contemporaneously with the shader in response to the at least one jump instruction, each prefetcher requesting a subsequent one of the plurality of cache lines from the memory, wherein each prefetcher corresponds to a respective jump instruction.

In a further example, computer-readable medium storing computer-executable instructions executable by a processor for graphics shading in a computing device. The computer-readable medium may include instructions for receiving a respective cache line of a plurality of cache lines of a shader stored in a memory, wherein the respective cache line and one or more other ones of the plurality of cache lines include at least one jump instruction. The computer-readable medium may further include instructions for executing the respective cache line of the shader and skipping to a next portion of the plurality of cache lines based on the at least one jump instruction. Additionally, the computer-readable medium may include instructions for executing one or more prefetchers contemporaneously with the shader in response to the at least one jump instruction, each prefetcher requesting a subsequent one of the plurality of cache lines from the memory, wherein each prefetcher corresponds to a respective jump instruction.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The specific features, implementations, and advantages of the disclosure will become better understood with regard to the following description, appended claims, and accompanying drawings where:

FIGS. 6-8 are conceptual diagrams of example timelines of execution of a shader according to the present disclosure;

FIG. 9 is a schematic diagram of an example of memory levels accessed during the execution of a prefetcher contemporaneously with a shader according to the present disclosure;

DETAILED DESCRIPTION

Figure 1:
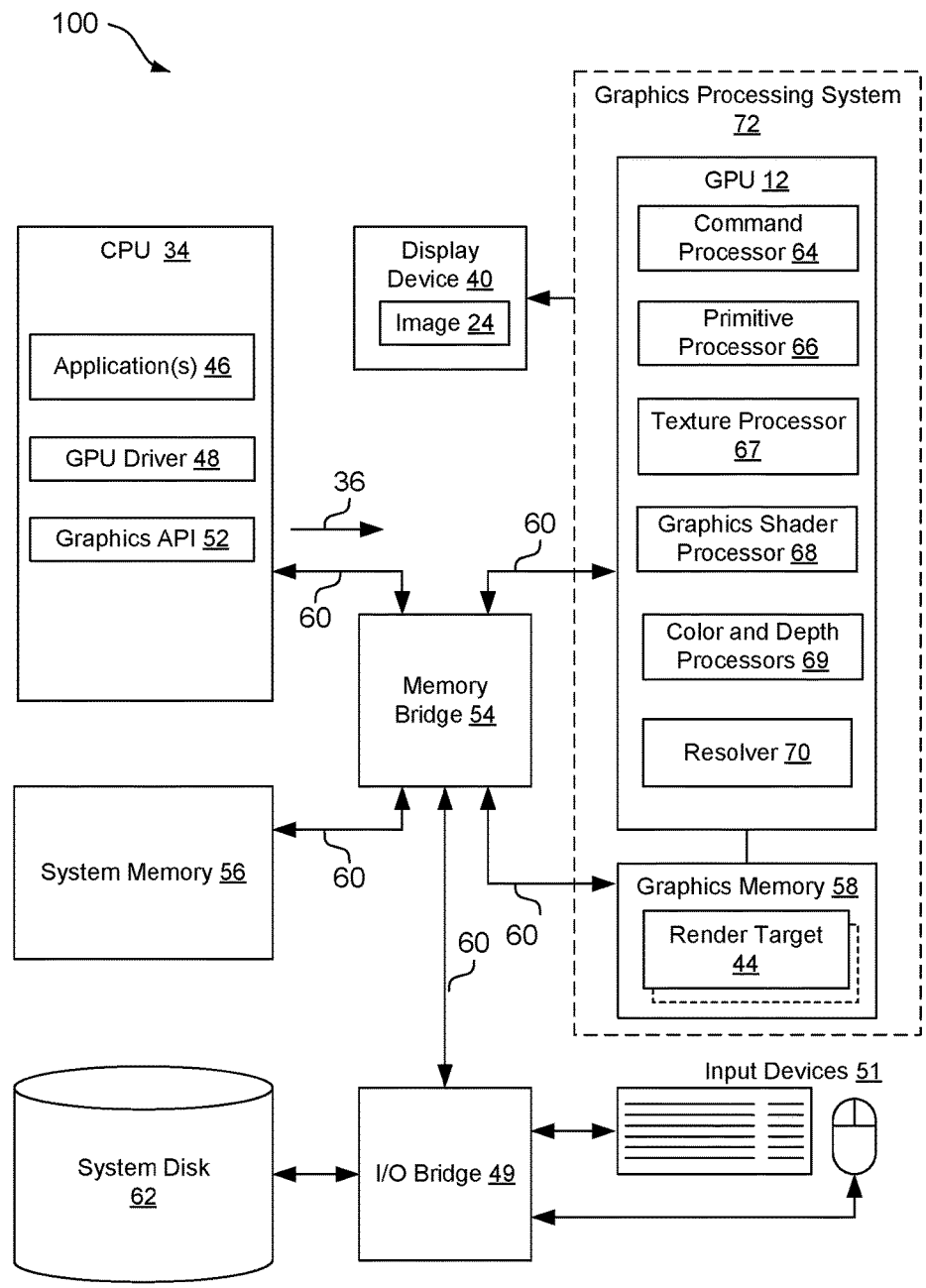
FIG. 1 is a schematic block diagram of an example architecture of a computer device including a graphics processing unit and a graphics pipeline configured according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In some implementations, examples may be depicted with reference to one or more components and one or more methods that may perform the actions or operations described herein, where components and/or actions/operations in dashed line may be optional.

The present disclosure includes a graphical processing unit (GPU) with a flexible, dynamic, application-directed mechanism for prefetching portions (e.g., cache lines) of a shading program being executed for graphics shading in a computing device. In particular, the present disclosure allows for reducing latency issues and bottlenecks that may occur during the execution of a shader when a request for a subsequent one of a plurality of cache lines of the shader cause delays in the execution of the shader, e.g., such as if the subsequent cache line is not located in a first level of cache. For example, the GPU may include a memory having a multi-level hierarchy, each level with different latencies. Specifically, the memory may include a main memory having a first latency, a level two cache having a second latency, and a level one cache having a third latency, where the first latency is greater than the second latency, and the second latency is greater than the third latency. Further, for example, if a request for a cache line is made, the level one cache is checked first, then the level two cache is checked, and then the main memory is checked. Instances in which the shader is long and has a plurality of threads of execution running in parallel, the impact on time of execution of the shader when failing to locate the requested subsequent cache line in the level one cache can be significant. As such, improvements are needed corresponding to the execution of the shader.

Accordingly, the present methods and apparatuses may provide an efficient solution, as compared to conventional solutions, by prefetching of cache lines during the execution of a shader. The present disclosure provides one or more mechanisms, including a jump instruction in a cache line, for initiating prefetching of a subsequent cache line of the shader stored in a memory. Further, the present disclosure provides one or more mechanisms for executing the respective cache line of the shader and skipping to a next one of the plurality of cache lines while the prefetching is occurring contemporaneously based on the at least one jump instruction.

Referring to FIG. 1, in one example, a computer device 100 includes a graphics processing unit (GPU) 12 configured to implement prefetching of cache lines based on a jump instruction in a currently executed cache line of a shader. For example, GPU 12 is configured to receive a respective cache line of a plurality of cache lines of a shader 202 stored in a memory 58. The respective cache line and one or more other ones of the plurality of cache lines include at least one jump instruction. Furthermore, GPU 12 may be configured to execute the respective cache line of the shader 202 and skipping to a next one of the plurality of cache lines based on the at least one jump instruction, and execute one or more prefetchers 204 contemporaneously with the shader 202, with each prefetcher 204 requesting a subsequent one of the plurality of cache lines from the memory 58 in response to a respective jump instruction.

For example, in one implementation, computer device 100 includes a CPU 34, which may be one or more processors that are specially-configured or programmed to control operation of computer device 100 according to the present disclosure. For instance, a user may provide an input to computer device 100 to cause CPU 34 to execute one or more software applications 46. Software applications 46 that execute on CPU 34 may include, for example, but are not limited to one or more of an operating system, a word processor application, an email application, a spread sheet application, a media player application, a video game application, a graphical user interface application or another program. Additionally, CPU 34 may include a GPU driver 48 that can be executed for controlling the operation of GPU 12. The user may provide input to computer device 100 via one or more input devices 51 such as a keyboard, a mouse, a microphone, a touch pad or another input device that is coupled to computer device 100 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics application programming interface (API) 52, such as, but not limited to, a DirectX and/or Direct3D API, an Open Graphics Library (OpenGL®) API, an Open Graphics Library Embedded Systems (OpenGL ES) API, an X3D API, a RenderMan API, a WebGL API, or any other public or proprietary standard graphics API. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

Computer device 100 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an example, memory bridge 54 may be a northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store user applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an example, computer device 100 may include or may be communicatively connected with a system disk 62, such as a CD-ROM or other removable memory device. System disk 62 may include programs and/or instructions that computer device 100 can use, for example, to boot operating system in the event that booting operating system from system memory 56 fails. System disk 62 may be communicatively coupled to the other components of computer device 100 via input/output bridge 49.

Figure 2:
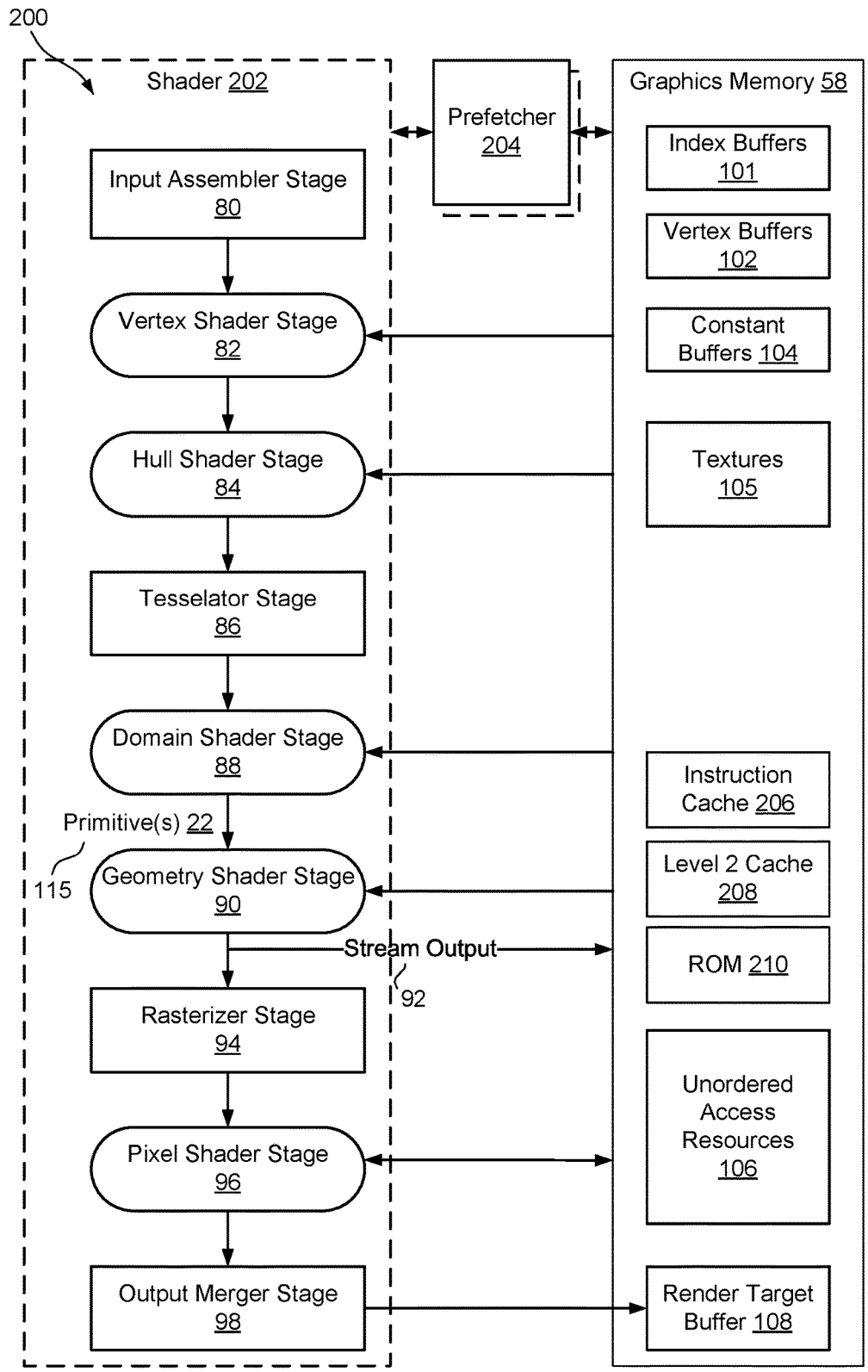
FIG. 2 is a schematic diagram of an example of the graphics pipeline and graphics memory of the computer device of FIG. 1.

As discussed above, GPU 12 may be configured to perform graphics operations to render one or more render targets 44 (e.g., based on graphics primitives) to display device 40 to form image 24, including instantiating the shader discussed herein in the form of a logical graphical pipeline (see, e.g., FIG. 2, logical graphical pipeline 200, and shader 202). For instance, when one of the software applications 46 executing on CPU 34 requires graphics processing, CPU 34 may provide graphics commands and graphics data associated with image 24, along with graphics command 36, to GPU 12 for rendering to display device 40. The graphics data may include, e.g., drawing commands, state information, primitive information, texture information, etc. GPU 12 may include one or more processors, including a command processor 64 for receiving graphics command 36 and initiating or controlling the subsequent graphics processing by at least one primitive processor 66 for assembling primitives, a plurality of graphics shader processors 68 for processing vertex, surface, pixel, and other data for GPU 12, one or more texture processors 67 for generating texture data for fragments or pixels, and one or more color and depth processors 69 for generating color data and depth data and merging the shading output. For example, primitive processor 66 may implement input assembler and rasterizer stages of a logical graphics pipeline 200, as is discussed below. GPU 12 may, in some instances, be built with a highly parallel structure that provide more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34.

GPU 12 may, in some instances, be integrated into a motherboard of computer device 10. In other instances, GPU 12 may be present on a graphics card that is installed in a port in the motherboard of computer device 100 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an implementation, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse SRP maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some implementations, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 100 via a wired or wireless communications link. For instance, display device 40 may be a computer monitor or flat panel display connected to a personal computer via a cable or wireless link.

According to one example of the present disclosure, graphic API 52 and GPU driver 48 may configure GPU 12 to execute logical graphics pipeline 200 (FIG. 2) to perform prefetching for a shader (e.g., shader 202 in FIG. 2) as described herein.

Referring to FIG. 2, for instance, in one example, GPU 12 can be configured to implement the stages of an example logical graphics pipeline 200 that may to perform prefetching for shader 202. In an implementation, one or more of the various stages may be programmable, for instance, to utilize the presently-described prefetching for a shader described herein. In this example, common shader cores may be represented by the rounded rectangular blocks. This programmability makes graphics pipeline 200 extremely flexible and adaptable. The purpose of each of the stages is now described in brief below, and additional functionality will be further described with respect to subsequent figures.

The input assembler stage 80 supplies data (triangles, lines, points, and indexes) to the pipeline. As explained below, stages 80 through 98 may correspond to a shader 202, which may be executed by the GPU 12 (FIG. 1). For example, GPU 12 may receive a respective cache line of a plurality of cache lines of a shader 202 stored in a memory 58. The respective cache line and one or more other ones of the plurality of cache lines may include at least one jump instruction. Further, GPU 12 may execute the respective cache line of the shader 202 and skip to a next one of the plurality of cache lines based on the at least one jump instruction, and execute one or more prefetchers 204 contemporaneously with the shader 202, with each prefetcher 204 requesting a subsequent one of the plurality of cache lines from the memory 58 in response to a respective jump instruction.

In particular, the vertex shader stage 82 processes vertices, typically performing operations such as transformations, skinning, and lighting. Vertex shader stage 82 takes a single input vertex and produces a single output vertex. The hull shader stage 84, a tessellator stage 86, and a domain-shader 88 stage comprise the tessellation stages. The tessellation stages convert higher-order surfaces to triangles, e.g., primitives 22, as indicated at 115, for rendering within logical graphics pipeline 200.

The geometry shader stage 90, optionally (e.g., this stage can be bypassed), processes entire primitives 22. Its input may be a full primitive 22 (which is three vertices for a triangle, two vertices for a line, or a single vertex for a point), a quad, or a rectangle. In addition, each primitive can also include the vertex data for any edge-adjacent primitives. This could include at most an additional three vertices for a triangle or an additional two vertices for a line. The geometry shader stage 90 also supports limited geometry amplification and de-amplification. Given an input primitive 22, the geometry shader stage 90 can discard the primitive, or emit one or more new primitives.

The stream-output stage 92 streams primitive data from graphics pipeline 200 to graphics memory 58 on its way to the rasterizer. Data can be streamed out and/or passed into a rasterizer stage 94. Data streamed out to graphics memory 58 can be recirculated back into graphics pipeline 200 as input data or read-back from the CPU 34 (FIG. 1).

The rasterizer stage 94 clips primitives, prepares primitives for a pixel shader stage 96, and determines how to invoke pixel shaders. Additionally, the rasterizer stage 94 performs fine scan conversions and determines pixel sample positions covered by the fragments. The pixel shader stage 96 receives interpolated data for primitives and/or fragments and generates per-pixel data, such as color and sample coverage masks.

The output merger stage 98 combines various types of pipeline output data (pixel shader values, depth and stencil information, and coverage masks) with the contents of the render target 44 (FIG. 1) and depth/stencil buffers to generate the final result of graphics pipeline 200.

Also, as discussed above and as illustrated in FIG. 2, graphics pipeline 200 may operate in conjunction with graphics memory 58 for exchanging and storing data. For example, in an implementation, graphics memory 58 includes one or more vertex buffers 102 that each contains the vertex data used to define geometry of image 24 (or other images). Vertex data includes position coordinates, color data, texture coordinate data, normal data, and so on. The simplest example of vertex buffer 102 is one that only contains position data. More often, vertex buffer 102 contains all the data needed to fully specify 3D vertices. An example of this could be vertex buffer 102 that contains per-vertex position, normal and texture coordinates. This data is usually organized as sets of per-vertex elements.

Further, in an implementation, graphics memory 58 may include one or more index buffers 101, which contain integer offsets into vertex buffers 102 and are used to render primitives 22 more efficiently. Each index buffer 101 contains a sequential set of indices; each index is used to identify a vertex in a respective vertex buffer 102.

Also, in an implementation, graphics memory 58 may include one or more constant buffers 104 that allows an efficient supply of shader constants, shader data, and/or any other shader resources to graphics pipeline 200. Further, constant buffer 104 can be used to store the results of the stream-output stage 92. Moreover, graphics memory 58 may include one or more texture buffers or textures data 105, such as bitmaps of pixel colors that give an object the appearance of texture.

Additionally, in an implementation, graphics memory 58 may include one or more unordered access view resources 106 (which includes buffers, textures, and texture arrays—without multisampling). Unordered access resources 106 allow temporally unordered read/write access from multiple threads. This means that this resource type can be read/written simultaneously by multiple threads without generating memory conflicts through the use of certain defined functions.

Moreover, in an implementation, graphics memory 58 may include one or more render target buffers 108, which contain the rendered target or drawing of each pixel of image 24 produced by graphics pipeline 200.

The structure of example implementations of the shader 202 and the method of operation of the shader 202 and/or the graphics pipeline 200 is described in more detail below.

Figure 3:
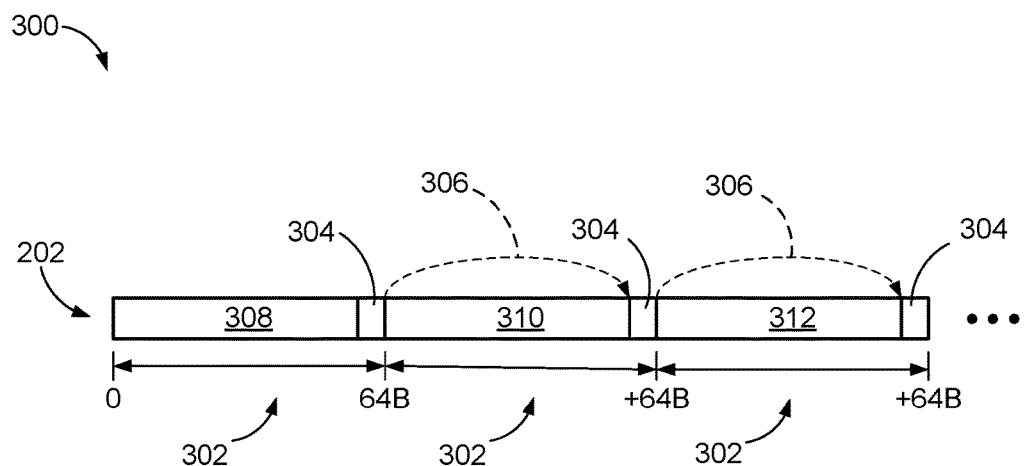
FIGS. 3 and 4 are conceptual diagrams of an example of a structure of a shader including a jump instruction that executes a prefetcher contemporaneously with the shader to prefetch a subsequent cache line, according to the present disclosure.
Figure 4:
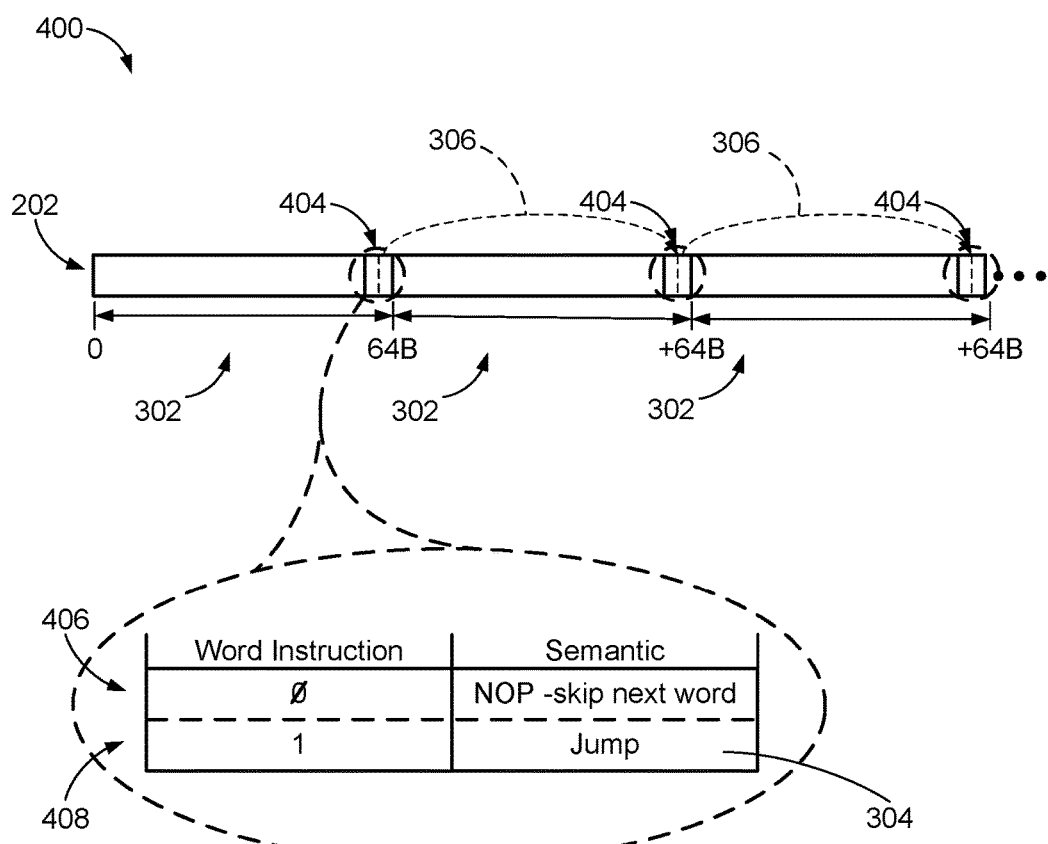

Referring now to FIGS. 3 and 4, conceptual diagrams 300 and 400 are shown of an example of a structure of a shader including a jump instruction that executes a prefetcher contemporaneously with the shader to prefetch a subsequent cache line, according to the present disclosure. In these examples, each cache line 302 may have a size of 64 bytes (B), however, cache lines of other size may also be utilized.

Referring to FIG. 3, for example, the conceptual diagram 300 includes an example of shader 202 (FIG. 1) being executed by graphics processing system 72 and configured to initiate prefetching to expedite graphics shading. In particular, shader 202 may be split up into sections (e.g., cache lines 302) of any byte length (e.g., 64 bytes) corresponding to the size of the cache line 302 (e.g., current cache line 308, first subsequent cache line 310, second subsequent cache line 312 . . . ) within a cache (e.g., instruction cache 206 of FIG. 1). Further, shader 202 includes one or more word instructions, such as in the form of one or more jump instructions 304, within one or more cache lines 302. Each jump instruction 304 includes a destination or location or word within shader 202 to which a program that recognizes and/or executes jump instruction 304 should move to or jump 306 for performing further processing (e.g., without processing or executing portions of shader 202 in between). It should be noted that the destination or location or word within shader 202 identified by jump instruction 304 may be at a location or in a cache line subsequent to the cache line in which jump instruction 304 is located, or in a location or in a cache line prior to the cache line in which jump instruction 304 is located. Also, it should be noted that jump instruction 304 may be located anywhere within a respective cache line 302. For instance, in some implementations, such as when word instruction includes jump instruction 304 and another instruction, such as a skip instruction, it may be desirable to locate jump instruction 304 at an end of the respective cache line 302 to enable shader 202 to continue processing a next cache line.

For example, jump instruction 304 in a current cache line 308 being executed may be recognized and processed by prefetcher 204, causing a jump 306 to a subsequent jump instruction 304 in a first subsequent cache line 310, thereby initiating a memory request to graphics memory 58 to fetch the first subsequent cache line 310 contemporaneously with execution of the current cache line 308. In an example, each cache line 302 may contain jump instruction 304 to a next cache line. As such, continuing with the above example, jump instruction 304 in first subsequent cache line 310 may be recognized and processed by prefetcher 204, e.g., contemporaneously with execution of a cache line (such as current cache line 308 or first subsequent cache line 310), causing a jump 306 to another subsequent jump instruction 304 in a second subsequent cache line 312, thereby initiating a memory request to graphics memory 58 to fetch the second subsequent cache line 312 contemporaneously with execution of the current cache lines 308 or first subsequent cache line 310. This process may continue throughout each cache line 302 in shader 202.

Accordingly, by prefetching one or more of the plurality of cache lines 302 based on one or more jump instructions 304, the shader 202 of the present disclosure may operate more efficiently and may reduce or eliminate one or more wait time periods that are associated with the operation of current shaders.

Referring to FIG. 4, in an example of one specific implementation 400, these jump instructions 304 may be included in a word instruction, such as a double-word instruction 404. In particular, the double-word instruction 404 may correspond to a double word No-operation (NOP) instruction in which the first word instruction 406 includes a NOP instruction (e.g., represented by a value of "0" in this case) that instructs the shader 202 to ignore the second word instruction 408 (such as jump instruction 304, represented by a value of "1" in this case) of the double word instruction 404 and skip to the next word or the next one of the plurality of cache lines 302. In this case, the second word instruction 408 of the double word instruction 404 instructs the one or more prefetchers (such as prefetcher 204 of FIG. 2) to jump 306 to a subsequent NOP instruction within a subsequent double word instruction 404 in a subsequent one of the plurality of cache lines 302 of the shader 202. By sequentially jumping 306 to each of the subsequent one of the plurality of cache lines 302 of the shader 202, the prefetcher 204 may be configured to transmit a request for the each of the subsequent one of the plurality of cache lines 302 from the memory in response to a respective jump instruction 304. As such, each of the plurality of cache lines 302 will be available in a cache prior to the shader 202 reaching each of the plurality of cache lines 302, thereby reducing or eliminating any potential bottleneck issues.

Figure 5:
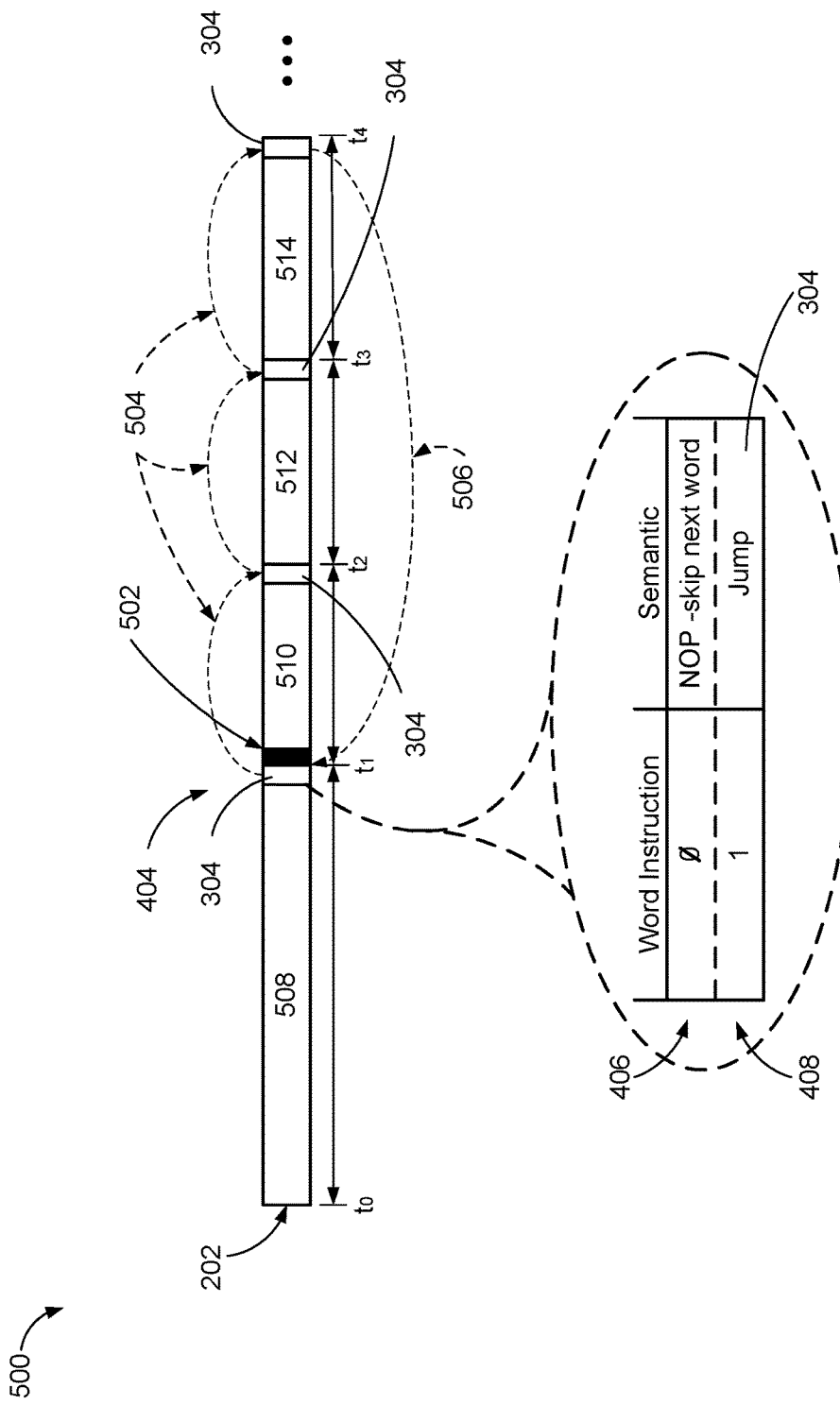
FIG. 5 is a conceptual diagram of an example of a structure of a shader including a jump instruction, located prior to a wait instruction, so as to initiate a prefetcher contemporaneously with a shader according to the present disclosure.

Referring now to FIG. 5, conceptual diagram 500 is shown of a structure of a shader 202 including a jump instruction 304, located prior to a wait instruction 502, so as to initiate a prefetcher 204 (FIG. 2) contemporaneously with a shader 202 according to the present disclosure. The conceptual diagram 500 illustrates a shader 202 being executed by graphics processing system 72 and/or GPU 12 (FIG. 1) for the purposes of graphics shading. In particular, shader 202 may include a wait instruction 502 corresponding to a class of instructions which may be configured to execute a texture read procedure from the memory. However, in an example, the length of executing the shader thread may cause latency issues for the shader and the graphic processing system. The shader 202 may need to complete the operation of the texture read procedure from the memory by the wait instruction 502 before returning and continuing the operation of the main thread of the shader 202.

In an example, jump instructions 304 may be inserted into the shader 202 before each wait instruction 502. In this example, the shader 202 may execute the first section 508 and skip the jump instruction 304 before the wait instruction 502 and execute the wait instruction 502 to execute the texture read procedure from the memory. Additionally, the prefetcher 204, which is executing contemporaneously with the shader 202, may recognize and process the jump instruction 304 and jump 504 from the jump instruction 304 before the wait instruction 502 to one or more subsequent jump instructions 304, and transmit a memory request for each of the plurality of cache lines (e.g., 510, 512, and 514) corresponding to each of the one or more subsequent jump instructions 304 based on jumping 504 to each of the one or more jump instructions 304. In an example, these jump instructions 304 may be included in a word instruction, such as a double-word instruction 404. The double-word instructions 404 may correspond to a double-word NOP instruction (FIG. 4).

After performing the jumps 504, the prefetcher may return 506 to the wait instruction 502 after transmitting the memory request for each of the plurality of cache lines (e.g., 510, 512, and 514). Furthermore, the amount of jumps 504 performed by the prefetcher 204 may be configurable. For example, the GPU 12 and/or prefetcher 204 may determine an estimated length for completing the wait instruction 502 (e.g., for completing the execution of the texture read procedure from the memory and receiving a result), and perform a number of jumps 504 corresponding to the estimated length for completing the wait instruction 502. As such, when the shader 202 completes execution of the texture read procedure corresponding to the wait instruction 502 and returns to the main thread of the shader 202, each of the plurality of cache lines (e.g., 510, 512, and 514) will be available in a cache prior to the shader 202 reaching each of the plurality of cache lines thereby reducing or eliminating any potential bottleneck issues.

Referring to FIGS. 6-8, example timelines 600, 700, and 800 of execution of differently-structured shaders have different efficiencies.

In an example, timeline 600 includes execution times ($t_{e0}$, $t_{e1}$, $t_{e2}$, etc.) of corresponding cache lines (e.g., cache line$_0$, cache line$_1$, cache line$_2$, etc.), and memory request times ($t_{r1}$, $t_{r2}$, $t_{r3}$, etc.) of memory requests (request$_0$, request$_1$, request$_2$, etc.) being made by a shader 601 that does not include, or execute contemporaneously with, a prefetcher 204 (FIG. 2). The timeline 600 of shader 601, without any prefetch operations, may take substantially longer to execute than shader 202 (FIGS. 7 and 8) operating contemporaneously with one or more prefetchers 204, as described herein, such as timeline 700 associated with a single prefetcher 204, or timeline 800 associated with multiple, contemporaneously-operating prefetchers 204.

For example, a GPU, such as GPU 12 (FIG. 1), may execute cache line$_0$ of shader 601 stored in a memory. However, without a prefetcher 204 executing contemporaneously with the shader 601, the shader 601 will need to send request$_1$ to request the subsequent cache line$_1$ of the shader 601 from the memory after execution of cache line$_0$, and then wait until that specific cache line$_1$ is found and available in order for the shader 202 to continue with the next bytes of code. This process is repeated for the entirety of the shader 601 (e.g., for cache line$_1$ and cache line$_2$ and corresponding request$_1$ and request$_2$). In the instance in which a subsequent cache line of the shader 601 is not located within the instruction cache 206 (FIG. 2), the latency issue arises since search for a subsequent cache line in the level two cache 208 and the ROM (or main memory) 210 requires a substantially larger amount of clock cycles as compared to the instruction cache 206.

Timeline 700 illustrates memory requests being made by a single prefetcher 204 executing contemporaneously with shader 202 before the shader 202 executes an entire cache line. For example, when the GPU 12 receives cache line$_0$ and one or more other ones of the plurality of cache lines from the memory they may include at least one jump instruction. GPU 12 may execute cache line$_0$ of shader 202 stored in a memory while a prefetcher 204 is contemporaneously executing with the shader 202. The prefetcher 204 may transmit a request$_1$ to the memory for the subsequent cache line$_1$ while the shader 202 is still executing cache line$_0$. Thus, the latency between the completion of the cache line$_0$ of the shader 202 and the beginning of the execution of cache line$_1$ is reduced by the prefetching operation. The prefetcher 204 may make another request$_2$ to the memory after completion of request$_1$, e.g., based on reading a jump instruction in cache line$_1$. Any memory request by prefetcher 204 may occur while a subsequent cache line of the shader 202 is executing so as to improve the efficiency of the operation.

The timeline 800 illustrates memory requests being made by multiple prefetchers 204 executing contemporaneously with shader 202 while the shader 202 executes a respective cache line. For example, when the GPU 12 receives the cache line$_0$ and one or more other ones of the plurality of cache lines from the memory they may include at least one jump instruction. GPU 12 may execute multiple prefetchers 204 contemporaneously with the shader 202. Each prefetcher 204 requests (request$_1$, request$_2$, and request$_3$, etc.) a subsequent one of the plurality of cache lines (cache line$_1$ and cache line$_2$, etc.) from the memory in response to a respective jump instruction. In an example, there may be a plurality of requests made for a plurality of subsequent one of the plurality of cache lines from the memory in response to multiple respective jump instructions. This results in a substantial reduction of latency issues, as compared with existing solutions, since the prefetchers 204 may make a plurality of requests before the cache line$_0$ finishes executing. The amount of time taken to complete each respective memory request may at least partially overlap, so that by the time that cache line$_1$ of the shader 202 begins executing, another memory request (request$_2$) for the cache line$_2$, (e.g., 64 bytes of the shader 202) is almost complete as well. This method greatly reduces or eliminates the latency issues by ensuring that the subsequent cache lines of the shader 202 are available in a cache before the shader 202 executes those subsequent cache lines without pauses/delays in the execution of the shader 202 for any further requests of cache lines.

Referring now to FIG. 9, a conceptual diagram 900 is shown of memory levels accessed during the execution of a prefetcher contemporaneously with a shader according to the present disclosure. The conceptual diagram 900 illustrates a shader execution block 902 transmitting a memory request 910 for a subsequent one of the plurality of cache lines from a memory. The memory may include a main memory 908 having a first latency, a level two cache having a second latency, and a level one cache having a third latency. For instance, the first latency is greater than the second latency, and the second latency is greater than the third latency. Therefore, a memory request 910 takes less clock cycles to search through the instruction cache 904 than either of the level 2 cache 906 or the main memory 908. In an example, the latency of the instruction cache 1004 is 4 clock cycles, the latency of the level 2 cache 906 is 100+ clock cycles, and the latency of the main memory 908 is 300+ clock cycles.

In an embodiment, when a prefetcher, such as prefetcher 204, is executing contemporaneously with a shader, such as shader 202, in shader execution block 902, one or more requests for a subsequent one of the plurality of cache lines from the memory are made in response to a respective jump instruction. Thus, if the subsequent one of the plurality of cache lines are not located within the instruction cache 206 and the GPU needs to search in level 2 cache 208 and/or main memory 210 (as illustrated by the dashed lines), the latency issues may be reduced since these requests are sent ahead of the execution of the subsequent one of the plurality of cache lines by the shader. Moreover, the GPU 12 is configured to read an entire cache line 302 corresponding to each memory requests 910 even if only one byte is requested, thereby ensuring that the entire cache line 302 is available for execution by the shader 202.

Figure 10:
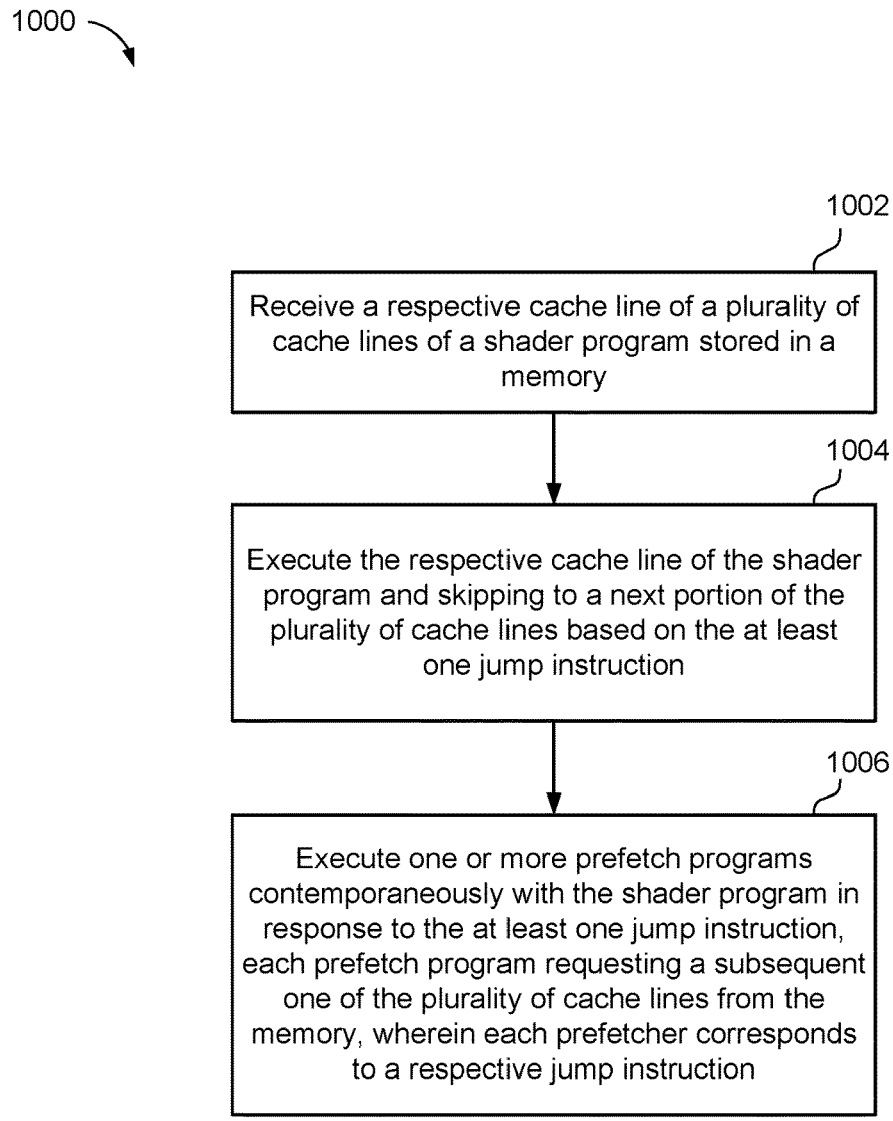
FIG. 10 is a flowchart of an example of a method of graphics shading according to the present disclosure.

FIG. 10 is a flow diagram illustrating examples of a method 1000 related to graphics shading accordance with various implementations of the present disclosure. Although the operations described below are presented in a particular order and/or as being performed by an example component, it should be understood that the ordering of the actions and the components performing the actions may be varied, depending on the implementation. Also, although the GPU 12 (FIG. 1) is illustrated as having a number of subcomponents, it should be understood that one or more of the illustrated subcomponents may be separate from, but in communication with, the GPU 12 (FIG. 1), and/or each other. Moreover, it should be understood that any of actions or components described below with respect to the GPU 12 (FIG. 1) and/or its subcomponents may be performed by a specially-programmed processor, a processor executing specially-programmed software or computer-readable media, or by any other combination of a hardware component and/or a software component specially configured for performing the described actions or components.

In an implementation, at block 1002, the method 1000 may receive a respective cache line of a plurality of cache lines of a shader stored in a memory, wherein the respective cache line and one or more other ones of the plurality of cache lines include at least one jump instruction. For example, the computer device 100 may execute GPU 12 (FIG. 1) to receive a respective cache line of a plurality of cache lines 302 of a shader 202 stored in a memory 58. The memory 58 includes a main memory 82 having a first latency, a level two cache 80 having a second latency, and a level one cache 78 having a third latency, wherein the first latency is greater than the second latency, and the second latency is greater than the third latency. Further, the respective cache line and one or more other ones of the plurality of cache lines 302 include at least one jump instruction 304.

In an example, the at least one jump instruction 304 corresponds to a second instruction word 408 of a double word NOP instruction 404. Additionally, in the example, a first instruction word 406 of the double word NOP instruction 404 comprises a NOP instruction.

In an implementation, at block 1004, the method 1000 may execute the respective cache line of the shader and skipping to a next portion of the plurality of cache lines based on the at least one jump instruction. For example, the computer device 100 may execute GPU 12 (FIG. 1) to execute the respective cache line 302 of the shader 202 and skipping to a next portion of the plurality of cache lines 302 based on the at least one jump instruction 304. In an example, each jump instruction 304 includes a destination or location or word within shader 202 to which a program that recognizes and/or executes jump instruction 304 should move to or jump 306 for performing further processing (e.g., without processing or executing portions of shader 202 in between). It should be noted that the destination or location or word within shader 202 identified by jump instruction 304 may be at a location or in a cache line subsequent to the cache line in which jump instruction 304 is located, or in a location or in a cache line prior to the cache line in which jump instruction 304 is located. Also, it should be noted that jump instruction 304 may be located anywhere within a respective cache line 302 (e.g., anywhere from the beginning, middle, or end). For instance, in some implementations, such as when word instruction includes jump instruction 304 and another instruction, such as a skip instruction, it may be desirable to locate jump instruction 304 at an end of the respective cache line 302 to enable shader 202 to continue processing a next cache line.

In an implementation, at block 1006, the method 1000 may execute one or more prefetchers contemporaneously with the shader in response to the at least one jump instruction, each prefetcher requesting a subsequent one of the plurality of cache lines from the memory, wherein each prefetcher corresponds to a respective jump instruction. For example, the computer device 100 may execute GPU 12 (FIG. 1) to execute one or more prefetchers 204 contemporaneously with the shader 202 in response to the at least one jump instruction 304, each prefetcher 204 requesting a subsequent one of the plurality of cache lines 302 from the memory 58, wherein each prefetcher 204 corresponds to a respective jump instruction.

Figure 11:
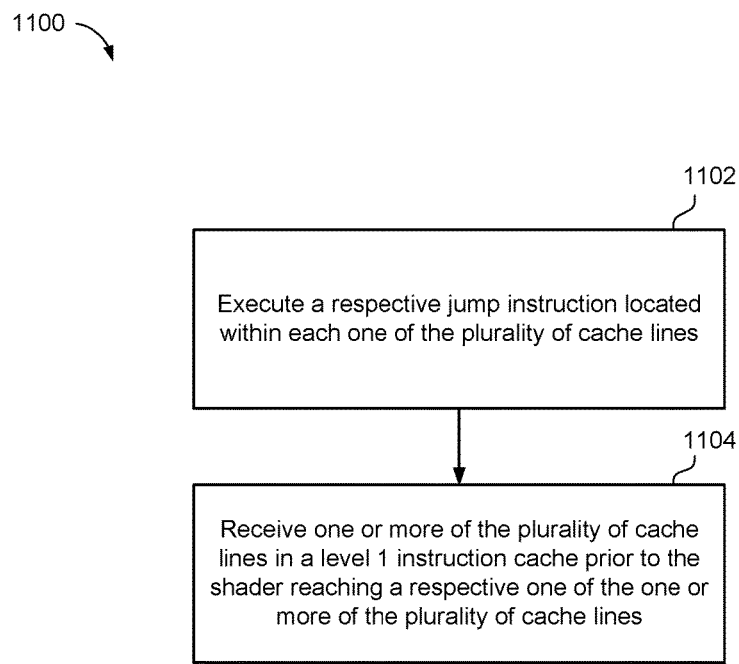
FIG. 11 is a flowchart of an example of a method of graphics shading with a structure of a shader including a jump instruction that executes a prefetcher contemporaneously with the shader to prefetch a subsequent cache line according to the present disclosure.

Referring to FIG. 11, a flow diagram illustrating an example method 1100 of block 1006 (FIG. 10) with a structure of a shader 202 including a jump instruction 304 that executes a prefetcher 204 contemporaneously with the shader 202 to prefetch a subsequent cache line 302.

In an implementation, at block 1102, method 1100 includes executing a respective jump instruction located within each one of the plurality of cache lines. For example, the computer device 100 may execute GPU 12 (FIG. 1) to execute a respective jump instruction 304 located within each one of the plurality of cache lines 302.

In an implementation, at block 1104, method 110 includes receiving one or more of the plurality of cache lines in a level 1 instruction cache prior to the shader reaching a respective one of the one or more of the plurality of cache lines. For example, the computer device 100 may execute GPU 12 (FIG. 1) to receive one or more of the plurality of cache lines 302 in a level 1 instruction cache 206 prior to the shader 202 reaching a respective one of the one or more of the plurality of cache lines 302.

Figure 12:
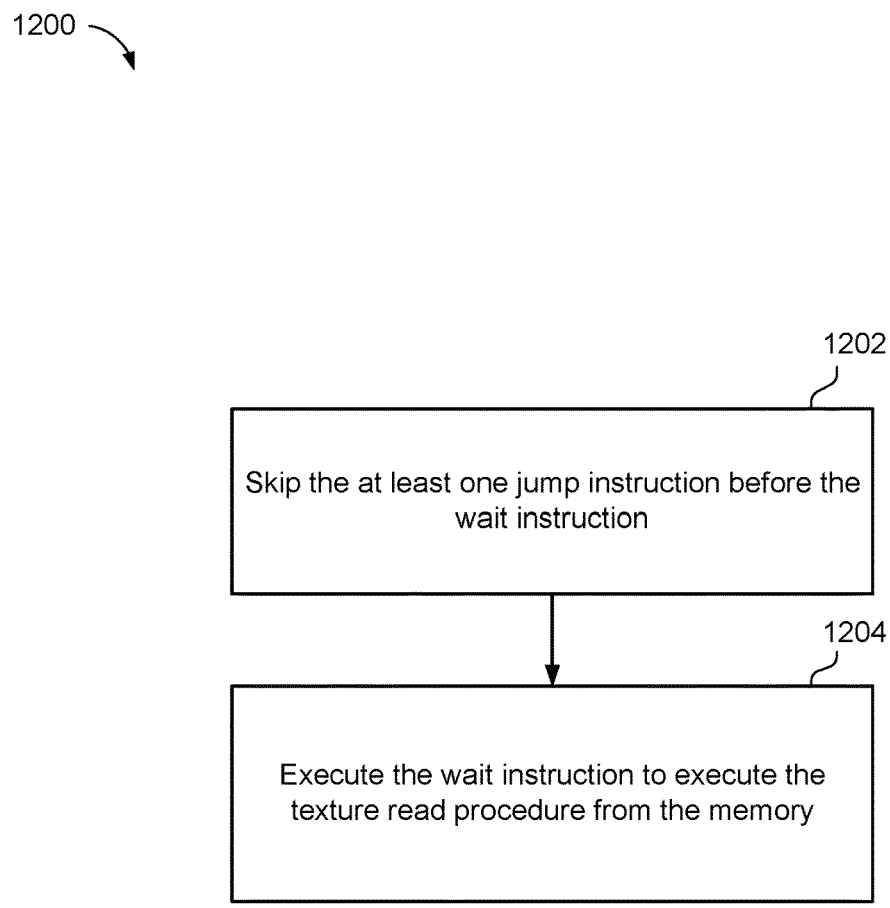
FIG. 12 is a flowchart of an example of a method of graphics shading with a structure of a shader including a jump instruction, located prior to a wait instruction, so as to initiate a prefetcher contemporaneously with a shader according to the present disclosure.

Referring to FIG. 12, a flow diagram illustrating an example method 1200 of block 1004 (FIG. 10) in which a structure of a shader 202 includes a jump instruction 304, located prior to a wait instruction 502 (FIG. 5), so as to initiate a prefetcher 204 contemporaneously with a shader 202.

In an implementation, at block 1202, method 1200 includes skipping the at least one jump instruction before the wait instruction. For example, the computer device 100 may execute GPU 12 (FIG. 1) to skip the at least one jump instruction 304 before the wait instruction 502.

In an implementation, at block 1204, method 1200 includes executing the wait instruction to execute the texture read procedure from the memory. For example, the computer device 100 may execute GPU 12 (FIG. 1) to execute the wait instruction 502 to execute the texture read procedure from the memory 58.

Figure 13:
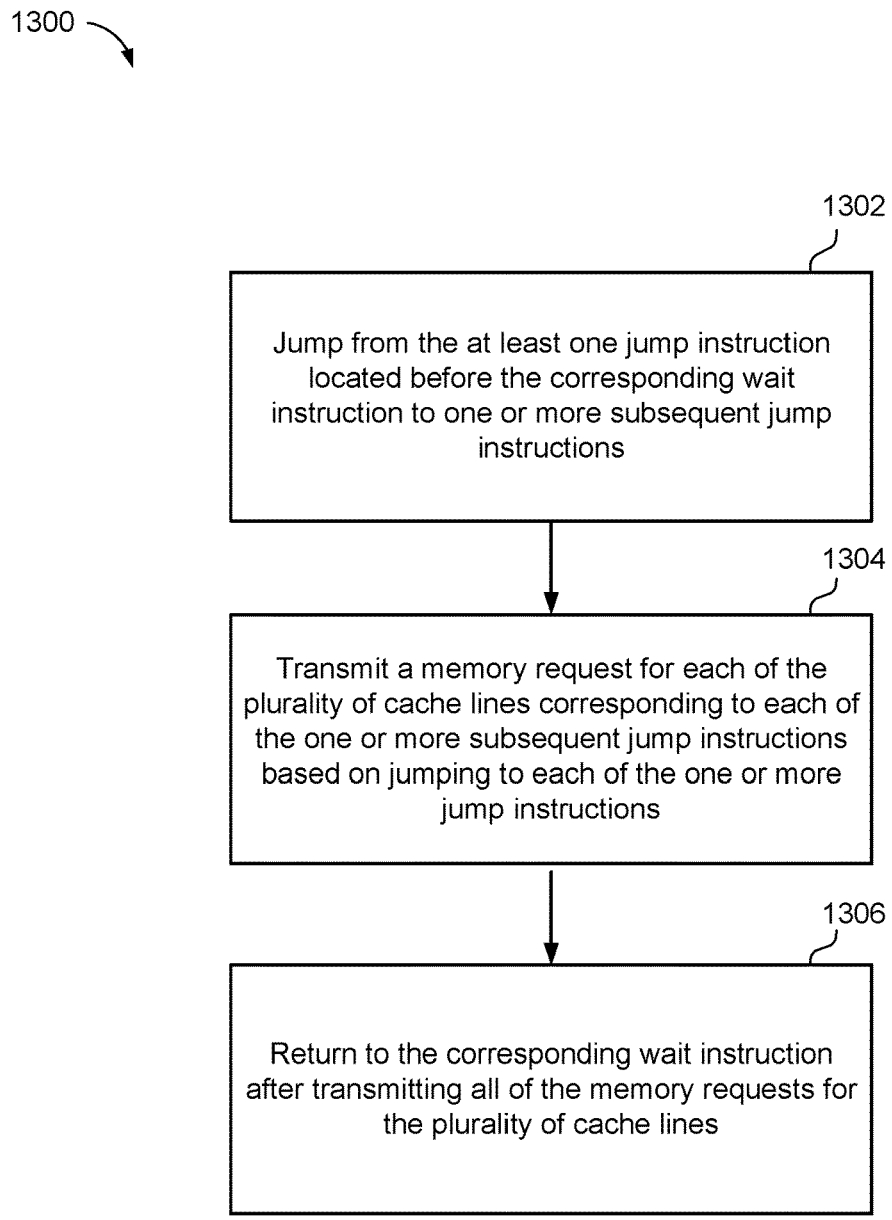
FIG. 13 is a flowchart of an example of a method of graphics shading with a structure of a shader including a jump instruction, located prior to a wait instruction, so as to initiate a prefetcher contemporaneously with a shader according to the present disclosure.

Referring to FIG. 13, a flow diagram illustrating an example method 1300 of block 1006 (FIG. 10) in which a structure of a shader includes a jump instruction, located prior to a wait instruction 502 (FIG. 5), so as to initiate a prefetcher contemporaneously with a shader.

In an implementation, at block 1302, method 1300 includes jumping from the at least one jump instruction located before the corresponding wait instruction to one or more subsequent jump instructions. For example, the computer device 100 may execute GPU 12 (FIG. 1) to jump 504 from the at least one jump instruction 304 located before the corresponding wait instruction 502 to one or more subsequent jump instructions 304.

In an implementation, at block 1304, method 1300 includes transmitting a memory request for each of the plurality of cache lines corresponding to each of the one or more subsequent jump instructions based on jumping to each of the one or more jump instructions. For example, the computer device 100 may execute GPU 12 (FIG. 1) to transmit a memory request for each of the plurality of cache lines (e.g., 510, 512, 514) corresponding to each of the one or more subsequent jump instructions 304 based on jumping 504 to each of the one or more jump instructions 304.

In an implementation, at block 1306, method 1300 includes returning to the corresponding wait instruction after transmitting all of the memory requests for the plurality of cache lines. For example, the computer device 100 may execute GPU 12 (FIG. 1) to return 506 to the corresponding wait instruction 502 after transmitting all of the memory requests for the plurality of cache lines (e.g., 510, 512, 514).

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 100 and/or computer device 1100), which can be a wired device or a wireless device. A wireless device may be a wearable electronic device, a cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A method of graphics shading in a computing device, comprising:
receiving a respective cache line of a plurality of cache lines of a shader stored in a memory, the shader being executed contemporaneously with one or more prefetchers, wherein the respective cache line includes at least one word instruction and a wait instruction, each of the at least one word instruction includes a skip instruction and a jump instruction, the skip instruction being located before the jump instruction;
skipping over the jump instruction located in the respective cache line during execution of the shader to a subsequent location in the respective cache line corresponding to the wait instruction based on the skip instruction, the wait instruction corresponding to one of a class of instructions where the shader is configured to complete execution of the wait instruction before returning to executing the respective cache line; and
initiating prefetching of one or more other ones of the plurality of cache lines by jumping to a subsequent word instruction in the one or more other ones of the plurality of cache lines based on the jump instruction, each prefetcher requesting a subsequent one of the plurality of cache lines from the memory and placing in a cache in response to the jump instruction, wherein each prefetcher corresponds to a respective jump instruction, and wherein executing the one or more prefetchers further comprises executing each of the jump instructions before the shader executes the wait instruction.

2. The method of claim 1, wherein executing the one or more prefetchers includes executing the respective jump instruction located within each one of the plurality of cache lines.

3. The method of claim 2, wherein executing the one or more prefetchers further comprises:
receiving one or more of the plurality of cache lines in a level 1 instruction cache prior to the shader reaching a respective one of the one or more of the plurality of cache lines.

4. The method of claim 1, wherein the wait instruction is configured to execute a texture read procedure from the memory.

5. The method of claim 4, wherein executing the respective cache line of the shader and skipping to the next one of the plurality of cache lines further comprises:
skipping the jump instruction before the wait instruction; and
executing the wait instruction to execute the texture read procedure from the memory.

6. The method of claim 4, wherein executing the one or more prefetchers contemporaneously with the shader further comprises:
jumping from the jump instruction located before the corresponding wait instruction to one or more subsequent jump instructions;
transmitting a memory request for each of the plurality of cache lines corresponding to each of the one or more subsequent jump instructions based on jumping to each of the one or more jump instructions; and
returning to the corresponding wait instruction after transmitting all of the memory requests for the plurality of cache lines.

7. The method of claim 6, further comprising:
determining that a length of the texture read procedure exceeds a procedure time-limit threshold; and
wherein jumping from the jump instruction before the corresponding wait instruction to the one or more subsequent jump instructions further comprises jumping from the jump instruction before the corresponding wait instruction to the one or more subsequent jump instructions based on a determination that the length of the texture read procedure exceeds the procedure time-limit threshold.

8. The method of claim 1, wherein the jump instruction corresponds to a second instruction word of a double word No-Operation (NOP) instruction, and wherein executing the one or more prefetchers includes jumping to a subsequent double word NOP instruction in the subsequent one of the plurality of cache lines of the shader in response to reading the second instruction word.

9. The method of claim 8, wherein a first instruction word of the double word NOP instruction comprises a NOP instruction, wherein executing the shader comprises ignoring the second instruction word of the double word NOP instruction and skipping to the next one of the plurality of cache lines.

10. The method of claim 1, wherein executing the one or more prefetchers includes transmitting a memory request to retrieve the subsequent one of the plurality of cache lines from one of a main memory having a first latency, a level two cache having a second latency, and a level one cache having a third latency, wherein the first latency is greater than the second latency, and the second latency is greater than the third latency.

11. A computer device, comprising:
a memory; and
a graphics processing unit (GPU) in communication with the memory, wherein the GPU is configured to:
receive a respective cache line of a plurality of cache lines of a shader stored in a memory, the shader being executed contemporaneously with one or more prefetchers, wherein the respective cache line includes at least one word instruction and a wait instruction, each of the at least one word instruction includes a skip instruction and a jump instruction, the skip instruction being located before the jump instruction;
skipping over the jump instruction located in the respective cache line during execution of the shader to a subsequent location in the respective cache line corresponding to the wait instruction based on the skip instruction, the wait instruction corresponding to one of a class of instructions where the shader is configured to complete execution of the wait instruction before returning to executing the respective cache line; and
initiating prefetching of one or more other ones of the plurality of cache lines by jumping to a subsequent word instruction in the one or more other ones of the plurality of cache lines based on the jump instruction, each prefetcher requesting a subsequent one of the plurality of cache lines from the memory and placing in a cache in response to the jump instruction, wherein each prefetcher corresponds to a respective jump instruction, and wherein executing the one or more prefetchers further comprises executing each of the jump instructions before the shader executes the wait instruction.

12. The computer device of claim 11, wherein the GPU configured to execute the one or more prefetchers is further configured to execute the respective jump instruction located within each one of the plurality of cache lines.

13. The computer device of claim 12, wherein the GPU configured to execute the one or more prefetchers is further configured to:
receive one or more of the plurality of cache lines in a level 1 instruction cache prior to the shader reaching a respective one of the one or more of the plurality of cache lines.

14. The computer device of claim 11, wherein the wait instruction is configured to execute a texture read procedure from the memory.

15. The computer device of claim 14, wherein the GPU configured to execute the respective cache line of the shader and skipping to the next one of the plurality of cache lines is further configured to:
skip the jump instruction before the wait instruction; and
execute the wait instruction to execute the texture read procedure from the memory.

16. The computer device of claim 14, wherein the GPU configured to execute the one or more prefetchers contemporaneously with the shader is further configured to:
jump from the jump instruction located before the corresponding wait instruction to one or more subsequent jump instructions;
transmit a memory request for each of the plurality of cache lines corresponding to each of the one or more subsequent jump instructions based on jumping to each of the one or more jump instructions; and
return to the corresponding wait instruction after transmitting all of the memory requests for the plurality of cache lines.

17. The computer device of claim 14, wherein the GPU is further configured to determine that a length of the texture read procedure exceeds a procedure time-limit threshold; and
wherein the GPU configured to jump from the jump instruction before the corresponding wait instruction to the one or more subsequent jump instructions is further configured to from the jump instruction before the corresponding wait instruction to the one or more subsequent jump instructions based on a determination that the length of the texture read procedure exceeds the procedure time-limit threshold.

18. The computer device of claim 11, wherein the jump instruction corresponds to a second instruction word of a double word No-Operation (NOP) instruction, and wherein executing the one or more prefetchers includes jumping to a subsequent double word NOP instruction in the subsequent one of the plurality of cache lines of the shader in response to reading the second instruction word.

19. The computer device of claim 18, wherein executing the one or more prefetchers includes transmitting a memory request to retrieve the subsequent one of the plurality of cache lines from one of a main memory having a first latency, a level two cache having a second latency, and a level one cache having a third latency, wherein the first latency is greater than the second latency, and the second latency is greater than the third latency.

20. A non-transitory computer-readable medium storing computer-executable instructions executable by a processor for graphics shading in a computing device, comprising:
instructions for receiving a respective cache line of a plurality of cache lines of a shader stored in a memory, the shader being executed contemporaneously with one or more prefetchers, wherein the respective cache line includes at least one word instruction and a wait instruction, each of the at least one word instruction includes a skip instruction and a jump instruction, the skip instruction being located before the jump instruction;
instructions for skipping over the jump instruction located in the respective cache line during execution of the shader to a subsequent location in the respective cache line corresponding to the wait instruction based on the skip instruction, the wait instruction corresponding to one of a class of instructions where the shader is configured to complete execution of the wait instruction before returning to executing the respective cache line; and
instructions for initiating prefetching of one or more other ones of the plurality of cache lines by jumping to a subsequent word instruction in the one or more other ones of the plurality of cache lines based on the jump instruction, each prefetcher requesting a subsequent one of the plurality of cache lines from the memory and placing in a cache in response to the jump instruction, wherein each prefetcher corresponds to a respective jump instruction, and wherein executing the one or more prefetchers further comprises executing each of the jump instructions before the shader executes the wait instruction.

21. A method of graphics shading in a computing device, comprising:
receiving a respective cache line of a plurality of cache lines of a shader stored in a memory, wherein the respective cache line and one or more other ones of the plurality of cache lines include at least one jump instruction, wherein the at least one jump instruction corresponds to a second instruction word of a double word No-Operation (NOP) instruction, and wherein executing the one or more prefetchers includes jumping to a subsequent double word NOP instruction in the subsequent one of the plurality of cache lines of the shader in response to reading the second instruction word, wherein a first instruction word of the double word NOP instruction comprises a NOP instruction, wherein executing the shader comprises ignoring the second instruction word of the double word NOP instruction and skipping to the next one of the plurality of cache lines;
executing the respective cache line of the shader and skipping to a next portion of the plurality of cache lines based on the at least one jump instruction; and
executing one or more prefetchers contemporaneously with the shader in response to the at least one jump instruction, each prefetcher requesting a subsequent one of the plurality of cache lines from the memory, wherein each prefetcher corresponds to a respective jump instruction.

* * * * *